(12) United States Patent
Chakrabarti et al.

(10) Patent No.: US 11,092,018 B2
(45) Date of Patent: Aug. 17, 2021

(54) UNDERPLATFORM DAMPING MEMBERS AND METHODS FOR TURBOCHARGER ASSEMBLIES

(71) Applicant: General Electric Company, Niskayuna, NY (US)

(72) Inventors: Suryarghya Chakrabarti, Niskayuna, NY (US); Yashwanth Tummala, Niskayuna, NY (US); Letian Wang, Niskayuna, NY (US); Walter John Smith, Niskayuna, NY (US); Daniel Edward Loringer, Erie, PA (US); Brian Denver Potter, Greenville, SC (US); Matthew John Malone, Lawrence Park, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 488 days.

(21) Appl. No.: 14/821,234

(22) Filed: Aug. 7, 2015

(65) Prior Publication Data
US 2017/0037734 A1    Feb. 9, 2017

(51) Int. Cl.
*F01D 5/26*    (2006.01)
*F01D 5/30*    (2006.01)
(Continued)

(52) U.S. Cl.
CPC .............. *F01D 5/26* (2013.01); *F01D 5/3007* (2013.01); *F01D 25/06* (2013.01); *F02B 33/40* (2013.01);
(Continued)

(58) Field of Classification Search
CPC . F01D 5/3007; F01D 5/26; F01D 5/10; F01D 25/06; F02B 33/40; F02M 35/10157
(Continued)

(56) References Cited

U.S. PATENT DOCUMENTS 2,310,412 A  *  2/1943  Fianders ................. F01D 5/225
                                                    416/190
2,942,842 A  *  6/1960  Hayes ....................... F01D 5/30
                                                    416/220 R
(Continued)

FOREIGN PATENT DOCUMENTS

EP          0851096 B1        4/2004
JP          02140403 A    *   5/1990
WO       2014159152 A1      10/2014

OTHER PUBLICATIONS

JP-02140403-A Machine Translation. Accessed JPO website on Novembers, 2018. 2 pages. (Year: 1990).*
(Continued)

*Primary Examiner* — Richard A Edgar
(74) *Attorney, Agent, or Firm* — The Small Patent Law Group LLC; John P. Darling

(57) ABSTRACT

Damping members for turbocharger assemblies, methods for providing turbocharger assemblies, and turbocharger assemblies are described herein. The damping members include bodies having shapes to fit between a recess extending into a rotor disk of a turbocharger and laterally protruding shoulders of platforms in neighboring blades of the turbocharger. The bodies dampen vibrations of the blades during rotation of the blades. The damping members may include a variety of shapes, such as a sheet, a wedge, a tapered pin, a cylindrical pin, a bent sheet, or another shape.

18 Claims, 7 Drawing Sheets

(51) Int. Cl.
  *F01D 25/06* (2006.01)
  *F02B 33/40* (2006.01)
  *F02M 35/10* (2006.01)

(52) U.S. Cl.
  CPC ... *F02M 35/10157* (2013.01); *F05D 2220/40* (2013.01); *F05D 2230/60* (2013.01); *F05D 2260/96* (2013.01); *Y02T 10/12* (2013.01)

(58) Field of Classification Search
  USPC .......................................................... 416/500
  See application file for complete search history.

(56) References Cited

U.S. PATENT DOCUMENTS

| | | | | |
|---|---|---|---|---|
| 3,001,760 | A * | 9/1961 | Guernsey | F01D 5/326 |
| | | | | 416/193 A |
| 3,037,741 | A * | 6/1962 | Tuft | F01D 5/22 |
| | | | | 416/193 A |
| 3,202,398 | A * | 8/1965 | Webb | F01D 5/323 |
| | | | | 416/193 A |
| 4,101,245 | A * | 7/1978 | Hess | F01D 5/22 |
| | | | | 416/190 |
| 4,497,611 | A * | 2/1985 | Keller | F01D 9/042 |
| | | | | 415/191 |
| 5,101,557 | A * | 4/1992 | Mueller | B23B 47/28 |
| | | | | 29/889.21 |
| 5,226,784 | A * | 7/1993 | Mueller | F01D 5/22 |
| | | | | 416/248 |
| 5,369,882 | A | 12/1994 | Dietz et al. | |
| 6,171,058 | B1 | 1/2001 | Stec | |
| 6,267,557 | B1 | 7/2001 | Chin | |
| 7,322,797 | B2 | 1/2008 | Lee et al. | |
| 8,137,071 | B2 | 3/2012 | Caucheteux et al. | |
| 8,328,506 | B2 * | 12/2012 | Furman | F01D 25/16 |
| | | | | 415/173.3 |
| 8,353,672 | B2 | 1/2013 | Townes et al. | |
| 8,951,013 | B2 | 2/2015 | Miller et al. | |
| 2015/0167471 | A1 * | 6/2015 | Deallenbach | F01D 5/22 |
| | | | | 416/204 A |

OTHER PUBLICATIONS

Panning et al.; "Asymmetrical Underplatform Dampers in Gas Turbine Bladings: Theory and Application"; ASME Turbo Expo 2004: Power for Land, Sea, and Air; Jun. 14-17, 2004; vol. 6; Paper No. GT2004-53316; pp. 269-280; Conference Location: Vienna, Austria.

Sanliturk, et al.; "Underplatform Dampers for Turbine Blades: Theoretical Modelling, Analysis and Comparison Experimental"; ASME 1999 International Gas Turbine and Aeroengine Congress and Exhibition, Structures and Dynamics; Jun. 7-10, 1999; vol. 4; Paper No. 99-GT-335 pp. V004T03A037; pp. 12; Conference Location: Indiana, USA.

* cited by examiner

UNDERPLATFORM DAMPING MEMBERS AND METHODS FOR TURBOCHARGER ASSEMBLIES

FIELD

Embodiments of the subject matter described herein relate to bodies and assemblies that reduce or eliminate vibrations of blades in turbocharger assemblies.

BACKGROUND

Turbochargers are used to increase the efficiency and power output of internal combustion engines, such as engines in locomotives or other vehicles. During operation, some turbochargers can operate over a broad range of speeds, such as 1,500 to 27,500 revolutions per minute (RPM) or other speeds. The turbine blades can be exposed to a large number of low per revolution aerodynamic drivers (e.g., 1-10 driver per revolution), which can make avoiding vibrations of the blades at various frequencies almost impossible.

As a result, turbocharger turbine blades experience high cycle fatigue-induced failures on multiple occasions. Without an external damper, the blades rely on the dovetail fits in the rotor disk for damping the vibrations. These fits can be heavily influenced by machining tolerances, which make the blades susceptible to high vibratory stresses. Reducing or eliminating these vibrations can extend the useful life of the turbine blades.

BRIEF DESCRIPTION

In one embodiment, a damping member (e.g., for a turbocharger assembly) includes a body having a shape to fit between a recess extending into a rotor disk of a turbocharger and laterally protruding shoulders of platforms in neighboring blades of the turbocharger. The body is configured to dampen vibrations of the blades during rotation of the blades and the rotor disk by engaging under surfaces of the shoulders of the platforms that oppose the rotor disk of at least one of the blades.

In another embodiment, a method (e.g., for providing a turbocharger assembly with damping members) includes forming a recess into an outer surface of a rotor disk in a turbocharger, the recess formed into the outer surface in a location that is between laterally protruding shoulders of platforms in neighboring blades of the turbocharger and inserting a damping member into the recess in the rotor disk such that the damping member is disposed between the rotor disk and the shoulders of the platforms in the blades subsequent to the blades being joined with the rotor disk. The damping member is inserted into the rotor disk to dampen vibrations of the blades during rotation of the blades and the rotor disk by engaging an under surface of the shoulders of the platforms that oppose the rotor disk of at least one of the blades.

In another embodiment, a turbocharger assembly includes a rotor disk, plural turbocharger blades, and damping members. The rotor disk has an exterior curved surface with dovetail slots extending into the rotor disk and recesses extending into the exterior curved surface between the dovetail slots. The blades having airfoils, platforms having laterally protruding shoulders, and dovetails disposed in the dovetail slots of the rotor disk. The damping members are disposed in the recesses in the rotor disk between the rotor disk and the shoulders of the platforms in pairs of the blades. The damping members are configured to dampen vibrations of the blades during rotation of the blades and the rotor disk by engaging an under surface of at least one of the shoulders of the platforms in the pairs of the blades.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments described herein provide damping members for turbocharger assemblies, turbocharger assemblies, and methods for adding damping members to turbocharger assemblies. The damping members alternatively may be referred to as dampers. The damping members can be added to turbocharger assemblies and/or the turbocharger assemblies can be manufactured to include the damping members in order to reduce vibrations of the blades of the turbochargers and thereby increase the useful life of the blades and turbochargers.

In one embodiment, under-platform damping members can help reduce the dependence on dovetail fits between dovetails of the blades and dovetail slots in the rotor disks and provide significant reduction in blade vibrations. The damping members can be added to an existing bladed-disk turbocharger assembly to retrofit the assembly, with no change to the connection ends of the blades and minor modifications to machining processes for the rotor disk of the turbocharger assembly. In one aspect, a damping member in the shape of a bent sheet can have an initial interference with the platforms of the blades to create a static preload force on the connection ends of the blades, which can prevent the damping member from moving relative to the turbocharger assembly (e.g., at low RPMs). Other shapes of the damping members described herein can ensure that the damping members remain in contact with platforms of adjacent blades even when the blades are out of plane with each other.

In operation, the damping members sit under the platform of adjacent blades and load up against the platforms of the blades due to centrifugal loading. Energy is dissipated to rubbing between the platforms and damping members, and this dissipation reduces or eliminates vibrations of the blades. Additionally, one or more of the platform damping members may be disposed between and engage adjacent blades in pairs of blades to reduce relative movements or vibrations between the adjacent blades.

Incorporating the damping members into turbocharger assemblies can mitigate high cycle fatigue (HCF) failures or other failures of the blades in the turbocharger assemblies caused by numerous aerodynamic drivers under broad operating speed ranges. The damping members can mitigate the risk of HCF failures by reducing vibratory stresses through friction damping caused between the platform of the blades and the damping members. The damping members that engage adjacent blades at the same time can reduce differences in the responses to the blades to the vibrations.

Figure 1:
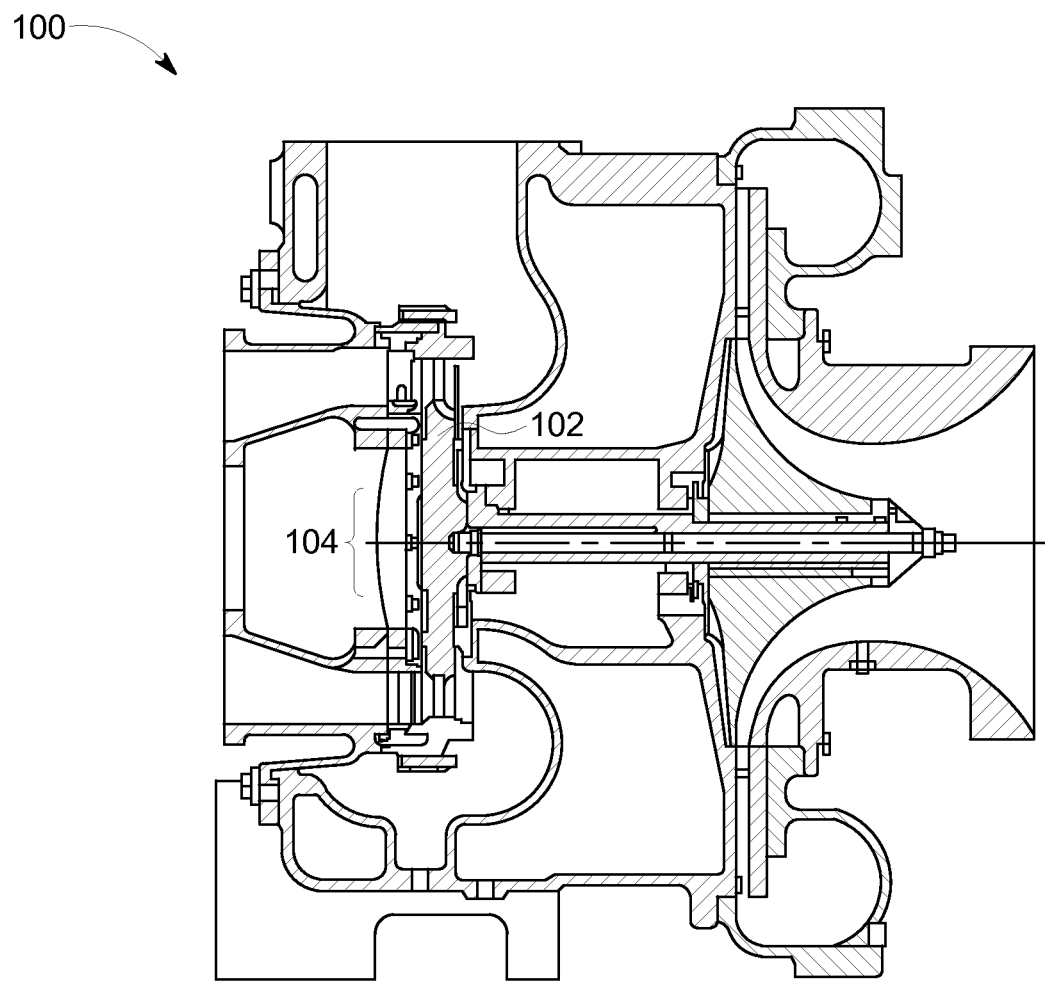
FIG. 1 is a perspective view of a turbocharger assembly according to one embodiment.

FIG. 1 is a cross-sectional view of a turbocharger assembly 100 according to one embodiment. The assembly 100 can be used to increase the power output of an engine, such as an engine in a locomotive. The assembly 100 receives engine exhaust or other airflow that rotates several blades 102 connected with a rotating rotor disk 104. The blades 102 and rotor disk 104 rotate to rotate a compressor, which compresses air into cylinders of an engine. The compressed air enables the engine to produce more power than an engine without the air being compressed by the turbocharger assembly 100.

Figure 2:
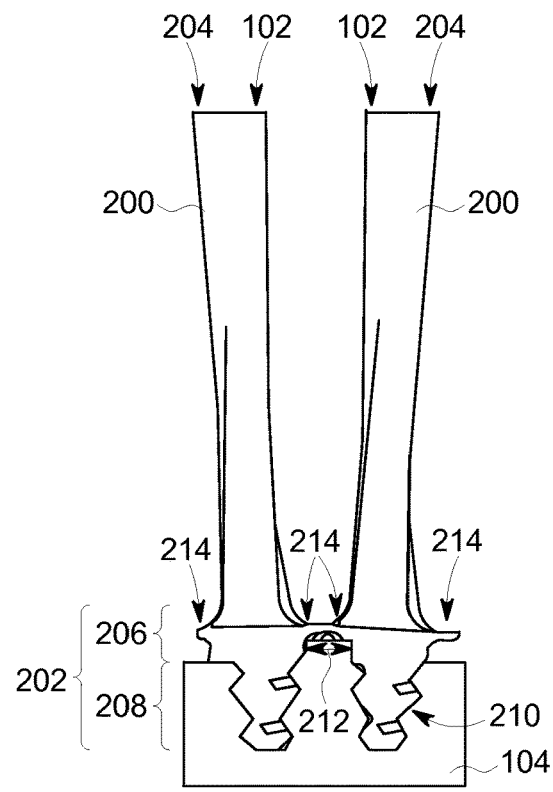
FIG. 2 illustrates a rotor disk and a pair of blades of the turbocharger assembly shown in FIG. 1 according to one embodiment.

FIG. 2 illustrates the rotor disk 104 and a pair of the blades 102 (also referred to as buckets) of the turbocharger assembly 100 shown in FIG. 1 according to one embodiment. The blades 102 include airfoils 200 connected to connection ends 202 that connect with the rotor disk. The airfoils 200 receive energy from the exhaust or other gas flowing through the turbocharger assembly 100. The airfoils 200 extend from distal ends 204 to the connection ends 202 on opposite proximal ends of the blades 102. The connection ends 202 include platform supports, or platforms 206, and dovetails 208 (also referred to as supports).

The dovetails 208 may be referred to as dovetail or tree supports due to the shape of the supports 208. The dovetails 208 are received into support slots 210 in the rotor disk 104. The connection ends 202 of neighboring blades 102 are separated from each other by a circumferential separation gap 212 that is measured along or parallel to an outer perimeter or circumference of the rotor disk 104.

The platforms 206 include protruding shoulders 214 that laterally extend outward (along a circumferential direction around the rotor disk 104) from the connection ends 202 toward the connection ends 202 of neighboring blades 102. For example, the platforms 206 of adjacent blades 102 may at least partially extend over the separation gap 202 between the blades 102.

The blades 102 shown in FIG. 2 do not include shanks that may be present in one or more known blades. Shanks in blades can include vertically elongated sections of the blades that extend from the dovetails 208 to the platforms 206. The shanks can be elongated in that the shanks extend a distance from the top edges of the dovetails 208 to under surfaces 306 (shown in FIG. 3) of the platforms 206 that is longer than the entire length of the dovetails 208.

Figure 3:
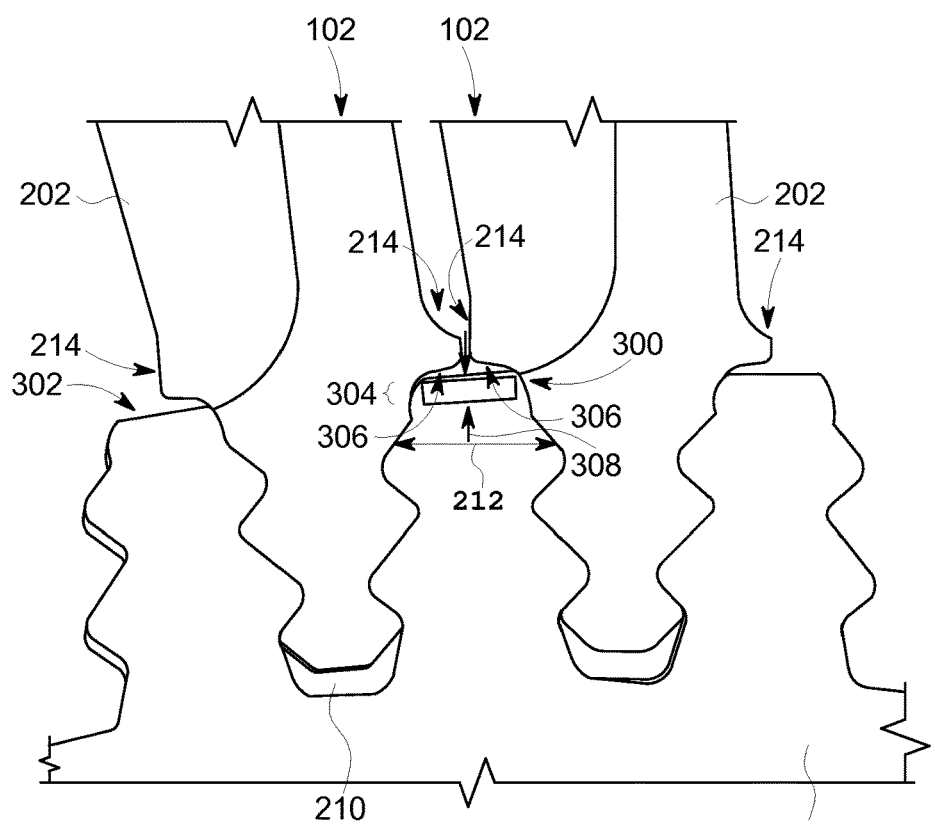
FIG. 3 illustrates another view of the rotor disk and the pair of blades shown in FIG. 2.
Figure 4:
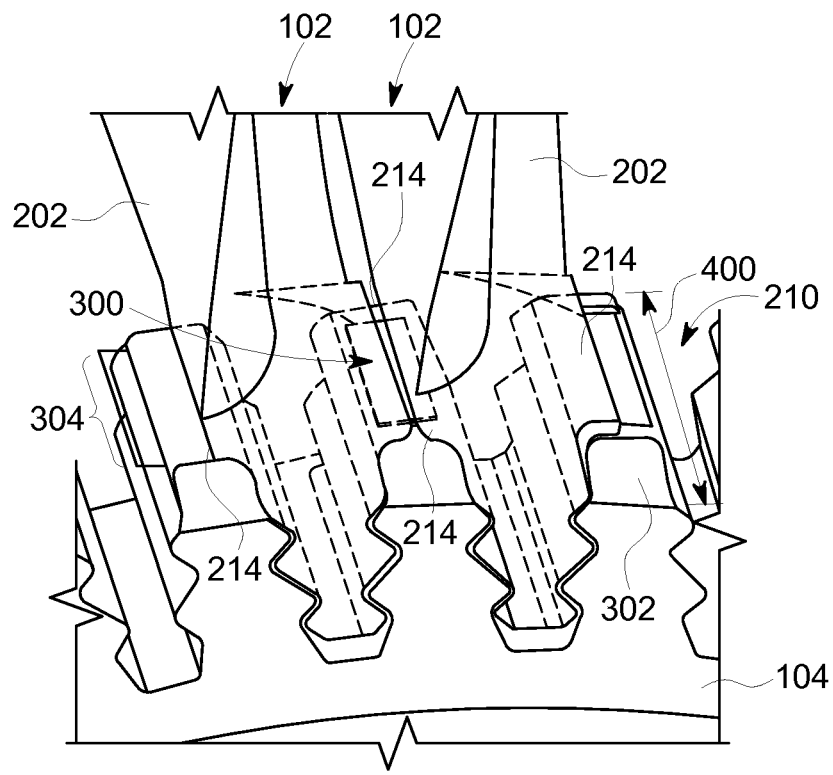
FIG. 4 illustrates a phantom view of the rotor disk and the pair of blades shown in FIGS. 2 and 3.

FIG. 3 illustrates another view of the rotor disk 104 and the pair of blades 102 shown in FIG. 2. FIG. 4 illustrates a phantom view of the rotor disk 104 and the pair of blades 102 shown in FIGS. 2 and 3. A damping member 300 may be disposed between the connection ends 202 of the neighboring blades 102 in the pair of blades 102. The damping member 300 also may be located between an exterior curved surface 302 of the rotor disk 104 ("Disc" in FIG. 3) and the shoulders 214 of the neighboring blades 102. The shoulders 214 on sides of the connection ends 202 in the neighboring blades 102 that face each other laterally extend toward each other. For example, the shoulders 214 of the connection ends 202 extend toward each other with the damping member 300 located beneath the shoulders 214, as shown in FIG. 3. The shoulders 214 include under surfaces 306 that face the exterior surface 302 of the rotor disk 104. The damping member 300 may be located between the rotor disk 104 and the under surfaces 306 of the platforms 214, and may therefore also be referred to as an underplatform damping member or underplatform dampener.

The rotor disk 104 includes recesses 304 that radially extend into the rotor disk 104 from the exterior surface 302 of the rotor disk 104. For example, the recesses 304 may be slots that are cut into the rotor disk 104 from the exterior surface 302 toward the center axis or axis of rotation of the rotor disk 104. Optionally, the rotor disk 104 may be fabricated (e.g., cast or machined) with the recesses 304 formed in the rotor disk 104. The recesses 304 can extend into the rotor disk 104 from the exterior surface 302 to a depth dimension 308. The recesses 304 are located between the connection ends 202 of the neighboring blades 102 (e.g., in the separation gap 212).

In the illustrated example, the recesses 304 do not extend across an entire thickness dimension 400 (shown in FIG. 4) of the rotor disk 104. Instead, the recesses 304 extend across most, but not all, of the thickness dimension 400. Alternatively, the recesses 304 may extend across the entire thickness dimension 400 of the rotor disk 104. Also in the illustrated example, the recesses 304 extend from one slot 210 to the neighboring slot 210 along the outer perimeter or circumference of the rotor disk 104. Alternatively, the recesses 304 may not extend from one slot 210 to the neighboring slot 210. The damping members 300 may be disposed and secured within the recesses 304. Alternatively, the rotor disk 104 may not include the recesses 304 and/or the damping member 300 may be outside of the recesses 304.

In the illustrated embodiment, the damping member 300 has a body with a shape of a sheet that concurrently engages the under surfaces 306 of the neighboring blades 102. For example, the damping member 300 may engage the under surfaces 306 of the shoulders 214 that extend toward each other from neighboring blades 102. Such a damping member 300 may be referred to as a blade-blade damping member or blade-blade dampener.

The damping member 300 reduces vibrations of the blades 102 during rotation of the blades 102 and the rotor disk 104. The damping member 300 can be formed of a resilient member that absorbs kinetic or vibrational energy of the blades 102 that is caused by vibration of the blades 102 (e.g., non-rotary movement of the blades 102). By engaging both blades 102 at the same time, the damping member 300 can ensure that the blades 102 are interconnected by a component other than the rotor disk 104 and, as a result, the blade-to-blade movements are reduced relative to not including the damping member 300.

In one aspect, several damping members 300 are positioned between the adjacent blades 102 in pairs of the blades 102 around the circumference of the rotor disk 104. For example, each blade 102 may have a damping member 300 on each side of the blade 102. This can result in each of the blades 102 in the assembly 100 engaging two damping members 300.

Figure 5:
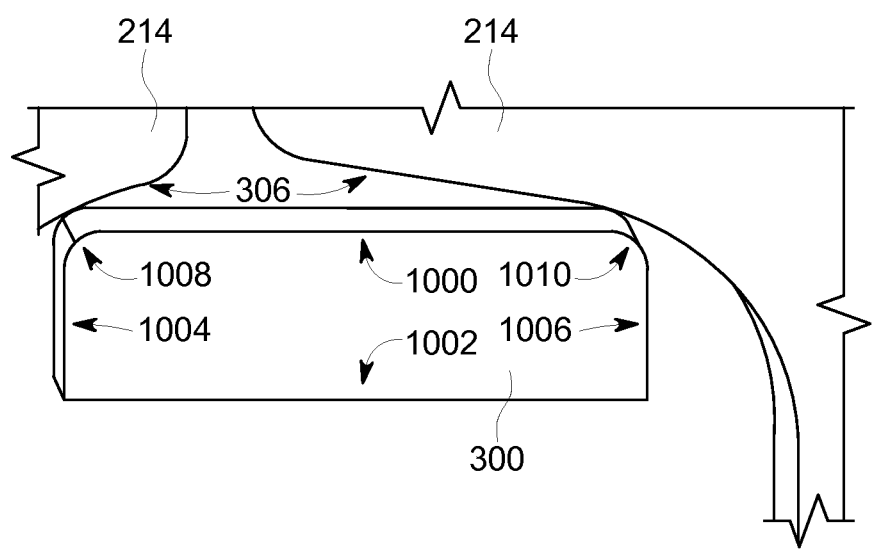
FIG. 5 illustrates a damping member shown in FIG. 3 according to one embodiment.

FIG. 5 illustrates the damping member 300 shown in FIG. 3 according to one embodiment. The damping member 300 can have the shape of a sheet with opposite parallel sides 1000, 1002 and opposite parallel edges 1004, 1006. The side 1000 may be referred to as an engagement side as the side 1000 can concurrently engage the under surfaces 306 of the platform shoulders 214 of adjacent blades 102. The side 1002 may be referred to as a rotor surface as the side 1002 engages or faces the rotor disk 104 in the recess 304 shown in FIG. 3.

The edges 1004, 1006 intersect the engagement side 1000 at interfaces 1008, 1010. In the illustrated example, the interfaces 1008, 1010 are rounded or curved surfaces. Alternatively, the interfaces 1008, 1010 are not rounded or curved. The interfaces 1008, 1010 may concurrently engage the under surfaces 306 of the platform shoulders 214. Alternatively, another portion of the damping member 300 may engage the under surfaces 306 of the platform shoulders 214.

In one aspect, the damping member 300 may have the same thickness between the sides 1000, 1002 throughout the entirety of the damping member 300. The thickness may be measured in directions that are normal to both the sides 1000, 1002. Alternatively, the thickness may vary at one or more locations in the damping member 300. For example, one half, quarter, or other portion of the damping member 300 may have a smaller or larger thickness than the other half, other quarters, or other remainder of the damping member 300. The thickness of the damping member 300 can change across the width and/or length of the damping member 300 in order for the damping member 300 to have a larger area that engages one or both of the under surfaces 306 of the platforms in the neighboring blades 102.

Figure 6:
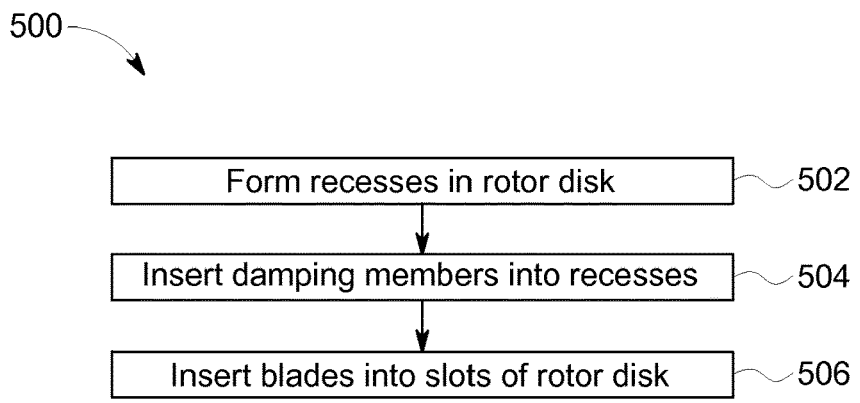
FIG. 6 illustrates a flowchart of a method for providing a turbocharger assembly with damping members according to one embodiment.

FIG. 6 illustrates a flowchart of a method 500 for providing a turbocharger assembly with damping members according to one embodiment. The method 500 may be used to manufacture a turbocharger assembly and/or retrofit a turbocharger assembly to include one or more embodiments of the underplatform damping members described herein. At 502, recesses are formed in a rotor disk. In one embodiment, the rotor disk of an existing turbocharger assembly may be obtained and the blades connected to the rotor disk may be removed (e.g., by sliding the blades 102 out of the slots 210 shown in FIG. 2 along axial directions or parallel to the axis of rotation of the rotor disk 104). The recesses 304 may then be cut into the exterior surface 302 (shown in FIG. 3) in the sections of the rotor disk 104 that are between the slots 210. Alternatively, the rotor disk may be created to include the recesses. For example, the rotor disk may be cast from a mold that has a shape to cause the rotor disk that is removed from the mold to include the recesses.

At 504, damping members are inserted into the recesses. The damping members may be placed into the recesses by sliding the damping members into the recesses (e.g., from a direction that is parallel to the outer perimeter or circumference of the rotor disk). Alternatively, the damping members may be placed into the recesses by placing the damping members in the recesses from above the rotor disk.

At 506, blades are inserted into the slots of the rotor disk. The blades 102 may be axially slid into the slots 210 along directions that are parallel to the center axis or axis of rotation of the rotor disk 104. The blades 102 may be positioned such that the shoulders 214 of the platforms 206 of the blades 102 (shown in FIG. 2) are above and/or engage the damping members 300. For example, the blades 102 may be connected with the rotor disk 104 such that the damping members 300 are between the platforms 206 and the rotor disk 104 along radial directions of the rotor disk 104.

Figure 7:
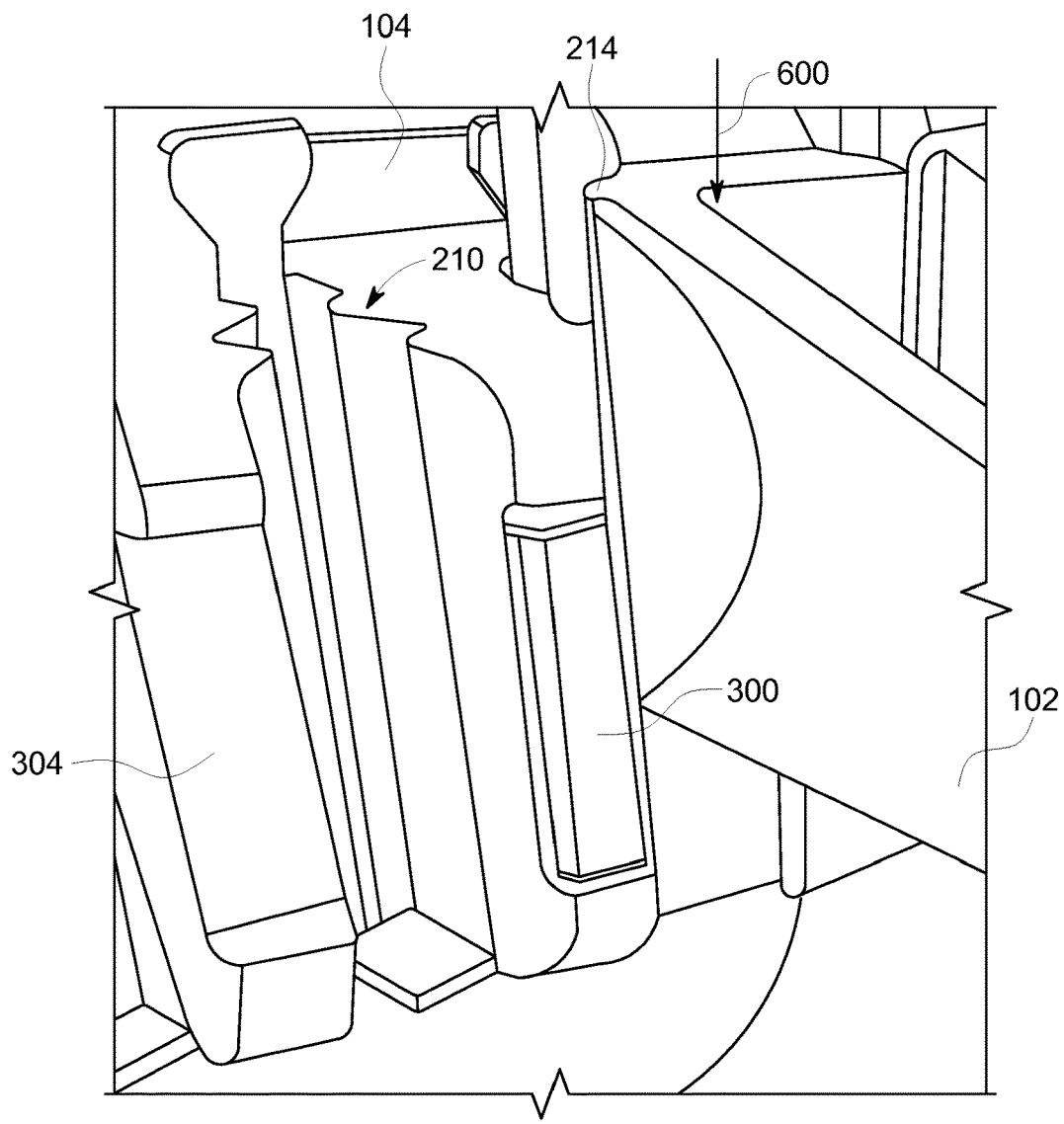
FIG. 7 illustrates insertion of one of the blades into a slot of the rotor disk shown in FIG. 2 according to one embodiment.

FIG. 7 illustrates insertion of one of the blades 102 into the slot 210 of the rotor disk 104 according to one embodiment. The blade 102 can be inserted into the slot 210 along an insertion or axial direction 600 so that the platforms 214 of the blade 102 engage the damping member 300 and/or are above the damping member 300. The rotor disk, blades, and damping members may then be placed in the turbocharger assembly.

Figure 8:
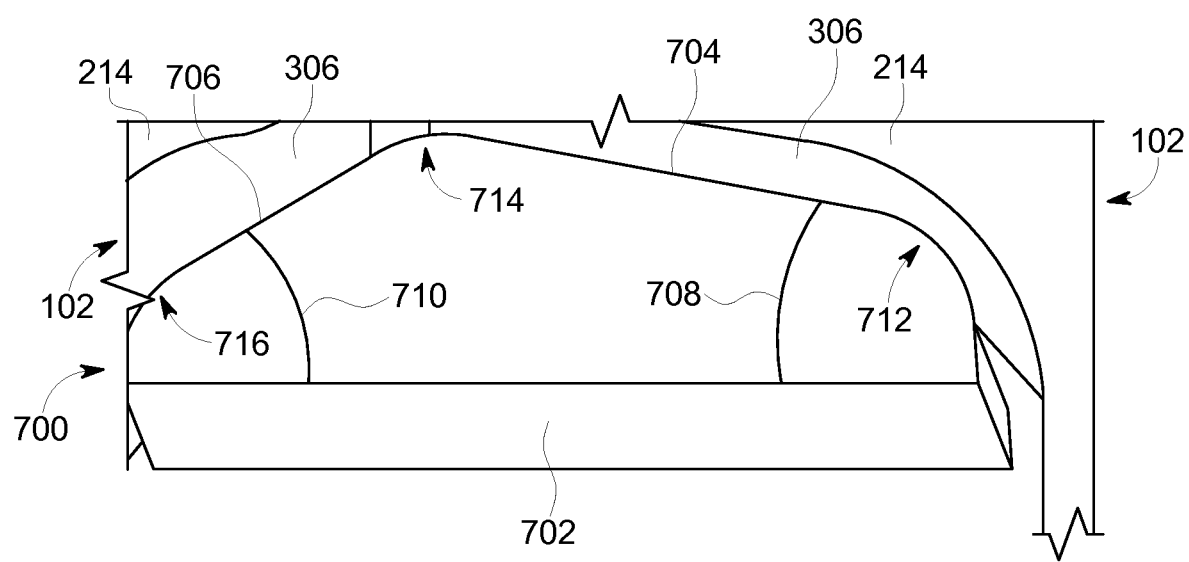
FIG. 8 illustrates a damping member according to another embodiment.

FIG. 8 illustrates a damping member 700 according to another embodiment.

The damping member 700 may be referred to as a wedge shaped damping member or wedge member. The damping member 700 has a body with a shape of a wedge that includes a rotor surface 702 and angled surfaces 704, 706. The rotor surface 702 is a flat or predominantly flat surface that engages the rotor disk 104 in the slot 304 shown in FIGS. 3 and 4 or that faces the rotor disk 104 in the slot 304.

The angled surfaces 704, 706 are transversely oriented with respect to the rotor surface 702. For example, the angled surfaces 704, 706 may be oriented at acute angles 708, 710 with respect to the rotor surface 702. The angles 708, 710 may differ from each other to provide the wedge shape of the damping member 700. In the illustrated embodiment, the angle 710 is larger than the angle 708. The surfaces 704, 706 include rounded portions 712, 716 and meet at a rounded interface 714. Alternatively, the portions 712, 716 and/or interface 714 may not be rounded.

The surface 704 may engage the under surface 306 of the platform shoulder 214 of one blade 102 in a pair of blades 102 and the surface 706 may engage the under surface 306 of the platform shoulder 214 of the other blade 102 in the pair of blades 102. As shown in FIG. 3, one of the shoulders 214 of each blade 102 laterally projects from the blade 102 farther than the other shoulder 214 of the same blade 102. The surface 704 of the damping member 700 may engage the under surface 306 of the shoulder 214 in one blade 102 that laterally projects farther from the blade 102 than the other shoulder 214 of the same blade 102. The surface 706 of the damping member 700 may engage the under surface 306 of the shoulder 214 in the other blade 102 that laterally projects a shorter distance from the blade 102 than the other shoulder 214 of the same blade 102. For platform shoulders that are not aligned with each other (the platform shoulders 214 of adjacent blades 102 are different radial distances from the surface of the rotor disk), the wedge shaped damping member can have a full surface contact against at least one of the platform shoulders in the neighboring blades 102. For example, the entire surface 704 may be in direct abutment with the under surface 306 of one of the platform shoulders 214. The platform shoulders 214 may be misaligned or out of alignment with respect to the rotor disk 104 when the platform shoulders 214 or the under surfaces 305 are canted up or canted down with respect to the exterior surface of the rotor disk 104.

Figure 9:
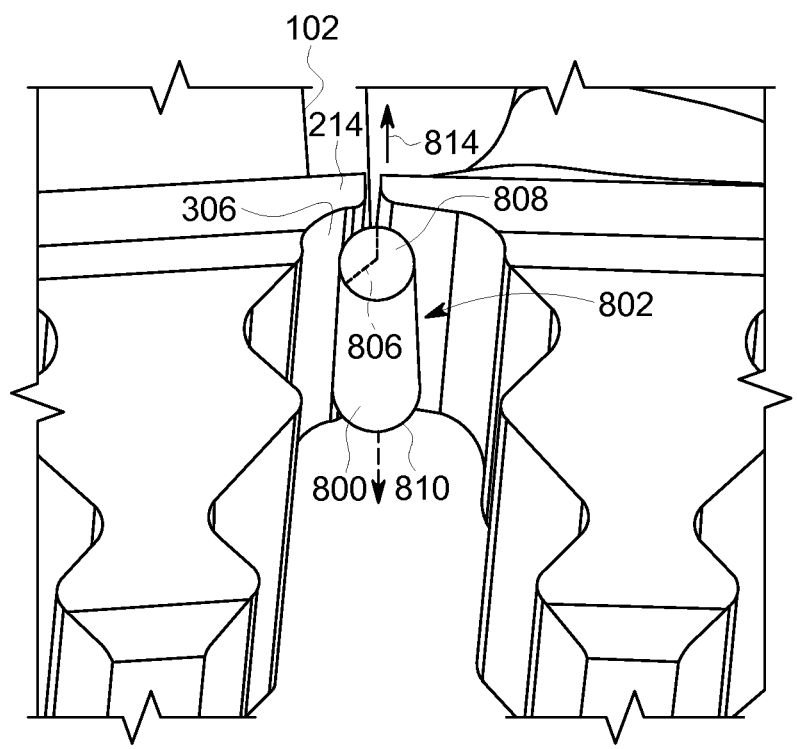
FIG. 9 illustrates a perspective view of a damping member according to another embodiment.
Figure 10:
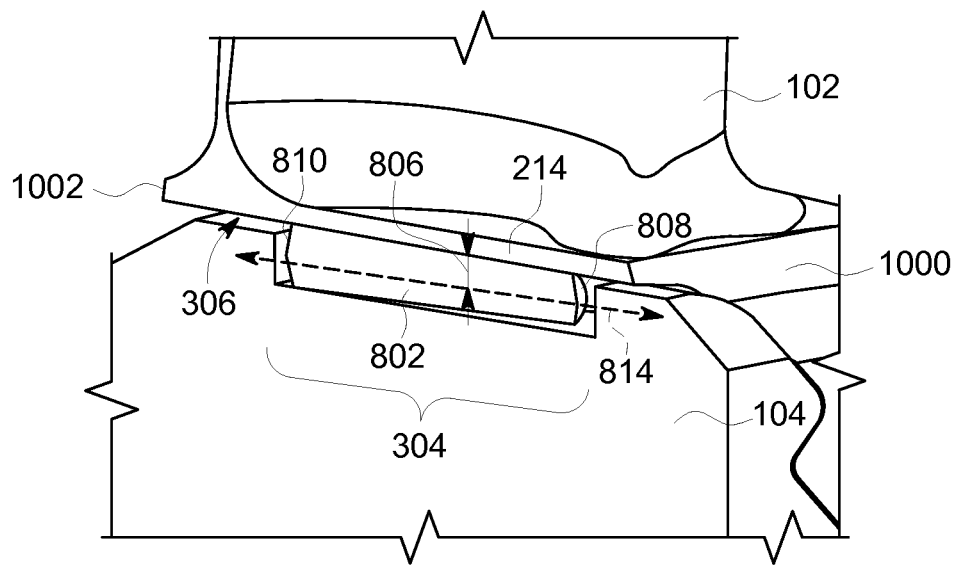
FIG. 10 illustrates and end view of the damping member shown in FIG. 9 according to one embodiment.

FIG. 9 illustrates a bottom view of a damping member 802 according to another embodiment. FIG. 10 illustrates a cross-sectional view of the damping member 802 shown in FIG. 9 according to one embodiment. The damping member 802 has a body with a shape of a tapered pin that is elongated along a length direction or center axis 814. The damping member 802 is elongated from a first end 808 to an opposite second end 810.

The damping member 802 also includes a curved surface 800 that extends along the length of the damping member 802 for all or a portion of the entire length of the damping member 802. The curved surface 800 of the damping member 802 has a radius of curvature that changes as a function of length along the length direction 814. For example, at the first end 808, the damping member 802 may have a radius dimension 806 that is measured from the center axis 814 to the curved surface 800. At the second end 810, the radius dimension 806 of the damping member 802 is larger. The radius dimension 806 may increase at different distances along the length direction or center axis 814 from the first end 808 to the second end 810. Conversely, the radius dimension 806 can decrease at different distances along the length direction or center axis 814 from the second end 810 to the first end 808. The changing sizes of the radius dimension 806 provides the damping member 802 with a tapered shape, as shown in FIG. 10. The damping member 802 can concurrently engage the under surfaces 306 of the platform shoulders 214 of the blades 102, also as shown in FIG. 10. The damping member 802 can make line contact against both under surfaces 306 of the platform shoulders 214 of neighboring blades 102 that extend toward each other. For example, the damping member 802 can engage the under surfaces 306 of the platform shoulders 214 of the neighboring blades 102 that extend toward each other along linear paths such that the intersections of the damping member 802 and the under surfaces 306 form lines. The damping member 802 can make line contact against both shoulders 214 even if the shoulders 214 are unaligned with each other. Unaligned shoulders 214 include shoulders 214 having under surfaces 306 that are different radial distances from the rotor disk. For example, a shoulder 214 that is unaligned with a shoulder 214 of another blade 102 may have one side 1000 (shown in FIG. 10) that is closer to the exterior surface of the rotor disk 104 than an opposite side 1002 (shown in FIG. 10) of the rotor disk 104, while the sides 1000, 1002 of the other shoulder 214 are different distances from the rotor disk 104. Such a shoulder 214 may be tilted toward the rotor disk 104, thereby causing one side 1000, 1002 to be closer to the rotor disk 104 than the other side 1002, 1000. The tapered pin shape of the damping member 802 can make line contact with both shoulders 214 even if the shoulders 214 are unaligned to further reduce vibrations of the blades 102 relative to damping members having other shapes.

Figure 11:
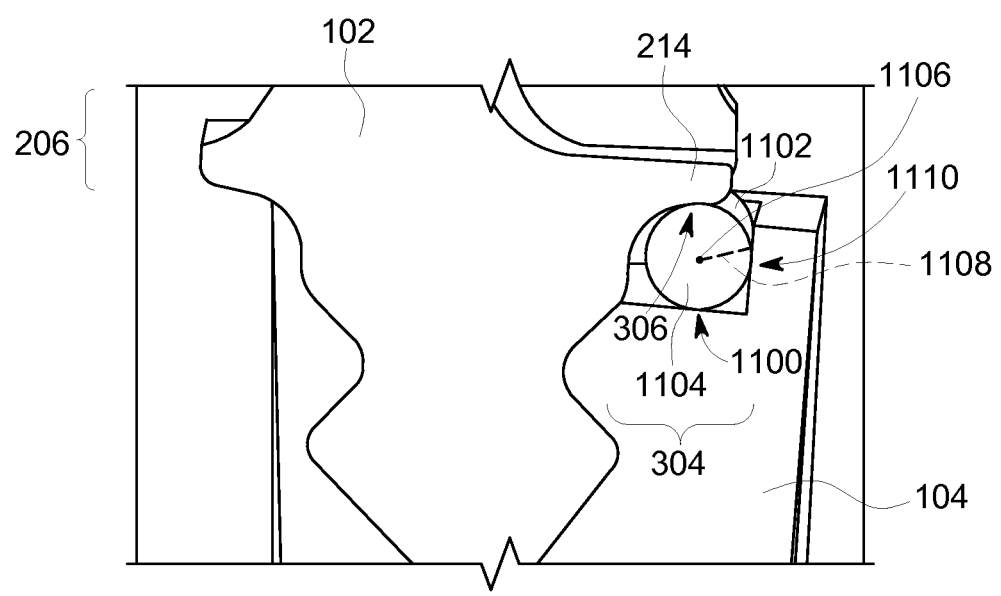
FIG. 11 illustrates an end view of another embodiment of a damping member.
Figure 12:
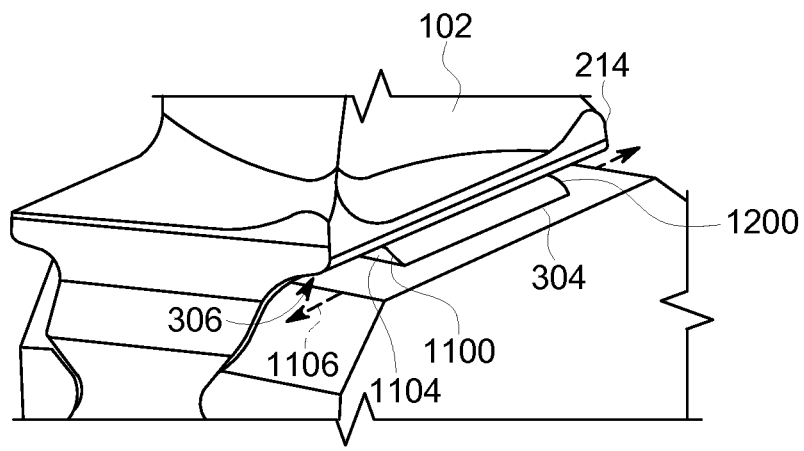
FIG. 12 illustrates a perspective view of the damping member shown in FIG. 11.

FIG. 11 illustrates an end view of another embodiment of a damping member 1100. FIG. 12 illustrates a perspective view of the damping member 1100 shown in FIG. 11. The damping member 1100 has a body with a shape of a cylindrical pin that is elongated along a length direction or center axis 1106. The damping member 1100 extends from one end surface 1104 to an opposite end surface 1200 (shown in FIG. 12). The damping member 1100 has a curved outer surface 1102 that has a constant or approximately constant (e.g., with variations due to manufacturing tolerances but remaining within 1%, 3%, 5%, etc. of the same size) radius dimension 1108 along the entire length of the damping member 1100.

Similar to the other damping members described herein, the damping members 1100 can be positioned in the recesses 304 of the rotor disk 104 and can engage the under surfaces 306 of one or more platform shoulders 214 of the blades 102. The damping member 1100 can have a sufficiently large radius dimension 1108 or diameter (e.g., twice the radius dimension 1108) that part, but not all, of the damping member 1100 protrudes or sticks out of the recess 304, as shown in FIG. 12. Optionally, the radius dimension 1108 or diameter may be larger or smaller such that more or less of the damping member 110 protrudes out of the recess 304.

In contrast to the damping members that concurrently engage the under surfaces 306 of platform shoulders 214 of two blades 102, the damping member 1100 may only engage the under surface 306 of a single platform shoulder 214 of one of the blades 102 in the pairs of blades 102. The damping member 1100 may engage the platform shoulder 214 that laterally projects farther from the connection end 202 of the blade 102 than the other platform shoulder 214, as shown in FIG. 11. Alternatively, the damping member 110 may engage the other platform shoulder 214.

The damping member 1100 may engage a sidewall 1110 of the recess 304. The sidewall 1110 includes an interior surface of the recess 304 that faces the connection end 202 of one of the buckets 102, as shown in FIG. 11. In contrast to one or more other embodiments of the damping members described herein, the damping member 1100 may engage the sidewall 1110 to provide another contact point for the damping member 1100 to reduce vibrations of the buckets 102.

Figure 13:
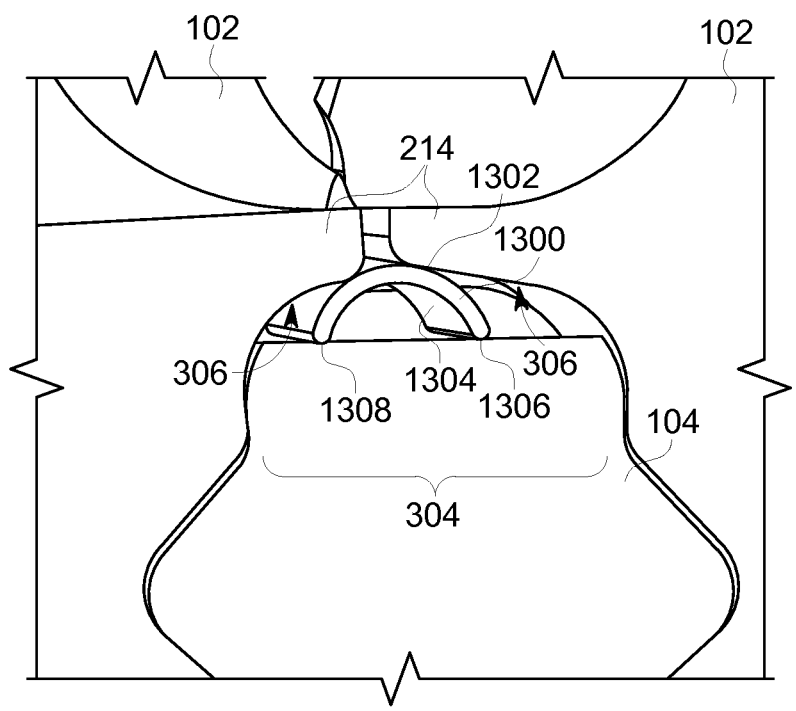
FIG. 13 illustrates a damping member according to another embodiment.

FIG. 13 illustrates a damping member 1300 according to another embodiment. The damping member 1300 has a body with a shape of a bent sheet. The damping member 1300 includes opposite outer and inner curved surfaces 1302, 1304 that are joined by opposite edges 1306, 1308. The damping member 1300 may be similar to the sheet-shaped damping member 300 (shown in FIG. 3), but with a smaller thickness dimension (measured from the surface 1302 to the surface 1304) than the damping member 300 and with the damping member 1300 being bent in a curved shape.

The edges 1306, 1308 may engage the rotor disk 104 in the recess 304 (shown in FIG. 3). The outer surface 1302 can engage the under surface 306 of the platform shoulders 214 of adjacent blades 102. For example, the outer surface 1302 can concurrently engage the under surface 306 of a platform shoulder 214 of one blade 102 and the under surface 306 of a platform shoulder 214 of the other blade 102 in a pair of blades 102, as shown in FIG. 13.

The damping member 1300 may be preloaded to impart a spring force on the platform shoulders 214 of the blades 102. For example, similar to a compression spring, the damping member 1300 may be partially deflected toward the rotor disk 104 by the platform shoulders 214 of the blades 102 after the blades 102 are coupled with the rotor disk 104. This deflection can compress the damping member 1300 and the compressed damping member 1300 may impart a reactive spring force back onto the platform shoulders 214. This reactive spring force can ensure that there are sufficient preload forces applied in the contact of the damping member 1300 against the shoulders 214 of the blades 102 to generate friction forces that reduce or eliminate vibrations of the blades 102 relative to one or more other types of damping members. Additionally, the damping member 1300 may deform when in contact with the shoulders 214 to increase the area of contact between the damping member 1300 and the under surfaces 306 of the shoulders 214, even for unaligned shoulders 214, relative to one or more other types of damping members.

Although various different embodiments of damping members are shown and described herein, other shapes of underplatform damping members may be used. The damping members disclosed herein may be placed into the recesses in the rotor disk or, in rotor disks that do not include recesses, on the exterior surfaces of the rotor disks beneath the platform shoulders of the blades. Alternatively, the damping members may be in other positions. The turbocharger assembly can include the same damping member between the blades in each pair of blades. Alternatively, the turbocharger assembly can include different damping members between the blades in two or more pairs of the blades.

The damping members described herein may be used with blades 102 that do not include shanks. As described above, a shank of a blade can include an elongated portion of the blade extending from the dovetail of the blade to the platform shoulders of the blade. The shank can provide additional space for damping members to be positioned between the blade and the rotor disk, but also can reduce the sizes of airfoils of the blades (which can reduce the effectiveness of the turbocharger). The damping members described herein can be positioned inside recesses of the rotor disk to allow for the damping members to reduce vibrations of the blades without using blades having shanks.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A damping member comprising:
a body having a shape to fit between (a) a recess that radially extends into an outer surface of a rotor disk of a turbocharger and (b) laterally protruding shoulders of platforms in at least two neighboring blades of the turbocharger, wherein the recess has an axial dimension greater than a circumferential dimension of the recess,
wherein the body is disposed, secured and retained within the recess in the rotor disk along a complete axial dimension of the body and a complete circumferential dimension of the body, wherein the axial dimension of the recess does not extend across an entire thickness dimension of the rotor disk, wherein the circumferential dimension of the recess extends in a circumferential direction under surfaces of the laterally protruding shoulders of the platforms in the neighboring blades of the turbocharger, and
wherein the body sits under the platforms in the neighboring blades, remains in contact with the platforms, provides friction damping between the platforms and the body and thereby dampens vibrations of the blades during rotation of the neighboring blades and the rotor disk by engaging along a line of contact, that extends a complete length of the body, under surfaces of the laterally protruding shoulders of the platforms that oppose the rotor disk of at least one of the neighboring blades.

2. The damping member of claim 1, wherein the body has the shape to concurrently engage the under surfaces of the shoulders of the platforms of the neighboring blades when the platforms are misaligned with respect to the rotor disk.

3. The damping member of claim 1, wherein the shape of the body is sized to fit between the recess in the rotor disk and the laterally protruding shoulders of the platforms in the neighboring blades that do not include shanks vertically extending between dovetails of the blades and the platforms of the neighboring blades.

4. The damping member of claim 1, wherein the body has the shape of a sheet having opposite parallel first and second sides and opposite parallel first and second edges, wherein the first and second edges intersect the first side at curved interfaces that are configured to concurrently engage the under surfaces of the shoulders of the platforms in the neighboring blades, and
wherein the opposite parallel first and second sides are closer to each other than the opposite parallel first and second edges.

5. The damping member of claim 1, wherein the body has the shape of a wedge comprising a rotor surface configured to engage the rotor disk inside the recess extending into the rotor disk, a first angled surface configured to concurrently engage the under surface of the shoulder of one of the neighboring blades that faces the rotor disk, and a second angled surface configured to concurrently engage the under surface of the shoulder of another one of the neighboring blades that opposes the rotor disk.

6. The damping member of claim 1, wherein the body has the shape of a tapered pin that is elongated along a length direction and that has a curved surface having a radius of curvature that changes as a function of length along the length direction.

7. The damping member of claim 6, wherein the curved surface of the body is configured to concurrently engage the under surfaces of the shoulders of the platforms in the neighboring blades.

8. The damping member of claim 1, wherein the body is formed from a resilient material configured to bend and generate a preload force applied against the under surfaces of the shoulders of the platforms in the neighboring blades.

9. The damping member of claim 1, wherein the body has the shape of a sheet bent in a U-shape, including opposite outer and inner curved surfaces that are joined by opposite edges.

10. A method comprising:
forming a recess into an outer surface of a rotor disk in a turbocharger, the recess formed into the outer surface in a location that is between laterally protruding shoulders of platforms in at least two neighboring blades of the turbocharger, wherein the recess has an axial dimension greater than a circumferential dimension, wherein the axial dimension of the recess does not extend across an entire thickness dimension of the rotor disk, and wherein the circumferential dimension extends in a circumferential direction under the surfaces of the shoulders of platforms of the neighboring blades of the turbocharger; and
inserting a damping member into the recess in the rotor disk such that the damping member is between the rotor disk and the shoulders of the platforms in the neighboring blades, wherein the recesses in the rotor disk secure and provide retainment of a respective damping member disposed therein along a complete axial dimension of the respective damping member and a complete circumferential dimension of the respective damping member, and wherein the damping member is inserted into the rotor disk and the damping member sits under the platforms in the neighboring blades, remains in contact with the platforms, provides friction damping between the platforms and the damping member and thereby dampens vibrations of the blades during rotation of the neighboring blades and the rotor disk by engaging along a line of contact, that extends a complete length of the damping member, an under surface of the shoulders of the platforms that oppose the rotor disk of at least one of the neighboring blades.

11. The method of claim 10, wherein forming the recess includes retrofitting the turbocharger that does not include sufficient space to fit the damping member between the rotor disk and the shoulders of the platforms in the neighboring blades by cutting into an exterior surface of the rotor disk to form the recess.

12. The method of claim 10, wherein inserting the damping member includes positioning the damping member between the rotor disk and the shoulders of the platforms in the neighboring blades that do not include shanks that vertically extend from dovetails of the blades to the platforms of the neighboring blades.

13. The method of claim 10, wherein inserting the damping member includes positioning the damping member between the rotor disk and the shoulders of the platforms in the neighboring blades such that the damping member concurrently engages the under surfaces of the shoulders that are misaligned with respect to the rotor disk.

14. A turbocharger assembly comprising:
a rotor disk having an exterior curved surface with dovetail slots extending into the rotor disk, the rotor disk also including one or more recesses extending into the exterior curved surface between the dovetail slots, wherein each of the recesses has an axial dimension greater than a circumferential dimension;
plural turbocharger blades having airfoils, platforms having laterally protruding shoulders, and dovetails disposed in the dovetail slots of the rotor disk, wherein the axial dimension of each of the recesses does not extend across an entire thickness dimension of the rotor disk, and wherein the circumferential dimension of each of the recesses extends in a circumferential direction under surfaces of the laterally protruding shoulders of the platforms in pairs of the turbocharger blades; and
damping members disposed in the recesses in the rotor disk between the rotor disk and the shoulders of the platforms in pairs of the turbocharger blades, wherein the recesses in the rotor disk secure and provide retainment of a respective damping member disposed therein along a complete axial dimension of the respective damping member and a complete circumferential dimension of the respective damping member, the damping members configured to sit under the platforms, remain in contact with the platforms, provide friction damping between the platforms and the damping members and thereby dampen vibrations of the turbocharger blades during rotation of the turbocharger blades and the rotor disk by engaging along a line of contact, that extends a complete length of the damping member, an under surface of at least one of the shoulders of the platforms in the pairs of the turbocharger blades.

15. The turbocharger assembly of claim 14, wherein the damping members have shapes that concurrently engage the under surfaces of the shoulders of the platforms in the pairs of the turbocharger blades even when the under surfaces are misaligned with respect to the rotor disk.

16. The turbocharger assembly of claim 14, wherein the turbocharger blades do not include shanks that vertically extend from the dovetails to the platforms.

17. The turbocharger assembly of claim 14, wherein the damping member has a shape of a tapered pin that is elongated along a length direction and that has a curved surface that intersects the rotor surface with a radius of curvature that changes as a function of length along the length direction.

18. The turbocharger assembly of claim 14, wherein the damping member has a shape of a cylindrical pin that is elongated along a length direction.

* * * * *